(12) United States Patent
Wang et al.

(10) Patent No.: US 6,235,931 B1
(45) Date of Patent: May 22, 2001

(54) PARTIAL OXIDATION OF POLYOXYALKYLENE POLYOL COMPOSITIONS TO POLYCARBOXYLIC ACID COMPOSITIONS

(75) Inventors: Pen-Chung Wang; Gayle Edward Back, both of Houston; Glynnda Addicks, Sugar Land; Jimmie Dale Elmore, Houston, all of TX (US); Herbert Elliott Fried, Owings Hills, MD (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/223,549

(22) Filed: Dec. 30, 1998

(51) Int. Cl.$^7$ .................................................. C07C 51/27
(52) U.S. Cl. ........................... 562/540; 562/538; 562/540
(58) Field of Search .................... 562/538, 540, 562/480

(56) References Cited

U.S. PATENT DOCUMENTS

| | | | |
|---|---|---|---|
| 3,477,990 | 11/1969 | Dante et al. | 260/47 |
| 4,734,468 | 3/1988 | Marx | 525/524 |
| 5,136,101 | 8/1992 | Fried | 568/402 |
| 5,136,102 | 8/1992 | Fried | 568/402 |
| 5,136,103 | 8/1992 | Fried | 568/402 |
| 5,155,278 | 10/1992 | Fried | 568/471 |
| 5,155,279 | 10/1992 | Fried | 568/471 |
| 5,155,280 | 10/1992 | Fried | 568/471 |
| 5,162,579 | 11/1992 | Fried | 562/537 |
| 5,166,422 | 11/1992 | Fried | 562/537 |
| 5,166,423 * | 11/1992 | Fried . | |
| 5,175,359 | 12/1992 | Fried | 562/537 |
| 5,175,360 | 12/1992 | Fried | 562/538 |
| 5,179,218 * | 1/1993 | Fried . | |
| 5,239,116 * | 8/1993 | Fried . | |
| 5,250,727 | 10/1993 | Fried | 562/540 |
| 5,256,819 | 10/1993 | Fried | 562/537 |
| 5,336,811 | 8/1994 | Fried | 568/436 |
| 5,352,824 | 10/1994 | Fried | 562/538 |
| 5,380,930 * | 1/1995 | Fried . | |
| 5,387,712 | 2/1995 | Fried | 562/420 |
| 5,391,822 * | 2/1995 | Fried . | |
| 5,401,874 | 3/1995 | Fried | 562/420 |
| 5,488,154 * | 1/1996 | Fried . | |
| 5,495,045 * | 2/1996 | Fried . | |
| 5,608,106 * | 3/1997 | Fried et al. . | |
| 5,608,107 * | 3/1997 | Fried et al. . | |
| 5,681,903 | 10/1997 | Fried et al. | 525/377 |

FOREIGN PATENT DOCUMENTS

| | | | | |
|---|---|---|---|---|
| 2332177 | 2/1974 | (DE) | | C07C/91/30 |
| 0000605 | 2/1979 | (EP) | | C08G/59/18 |

* cited by examiner

Primary Examiner—Paul J. Killos
(74) Attorney, Agent, or Firm—Dennis V. Carmen

(57) ABSTRACT

A process for partially oxidizing and converting a polyoxyalkylene polyol composition to a polycarboxylic acid composition comprising reacting a polyoxyalkylene polyol composition with a stable free radical nitroxide in the presence of an $NO_x$ generating compound, a flow of air or oxygen, and optionally water, at elevated temperatures. The oxidation reaction is discontinued by deactivating the catalyst and removing the source of air or oxygen, the $NO_x$ generating source, and the optional water. From 60% to no more than 95% of the polyoxyalkylene polyol composition is converted.

61 Claims, No Drawings

PARTIAL OXIDATION OF POLYOXYALKYLENE POLYOL COMPOSITIONS TO POLYCARBOXYLIC ACID COMPOSITIONS

FIELD OF INVENTION

This invention relates to process for oxidizing polyoxyalkylene alcohols and/or glycols to their corresponding carboxylic acids in the presence of a free radical nitroxide and an $NO_x$ generating compound.

BACKGROUND OF THE INVENTION

The oxidation of polyoxyalkylene alcohols and glycols to their corresponding carboxylates in the presence of a free radical nitroxide and an $NO_x$ generating compound is described in various patents to Shell Oil Company by Herbert Fried. For example, U.S. Pat. No. 5,256,819 describes the oxidation of polyoxyalkylene glycols to their carboxylates in high yields (greater than about 98%) and high selectivities by using a free radical nitroxide, an $NO_x$ generating source, and an additional source of oxygen such as oxygen gas, in the presence of a solvent such as dichloromethane, triglyme, monoglyme, diglyme, tertiary amyl alcohol, acetonitrile, and the like. The results from the examples demonstrate degrees of conversion to the carboxylate in excess of 99%, with selectivities in excess of 99%.

SUMMARY OF THE INVENTION

We have discovered that it is not desirable to use highly converted carboxylate compositions of polyoxyalkylene alcohols and glycols as reagents in the manufacture of water borne epoxy resin compositions, and we have further discovered that it is desirable to only partially convert polyoxyalklyene alcohols and glycols to their corresponding carboxylates.

The carboxylates of the polyoxyalkylene alcohols and glycols are useful as reactive surfactants to provide stable dispersions of epoxy resin in water. In the manufacture of epoxy resin surfactants, however, we have found that carboxylate compositions made by high conversion of polyoxyalkylene alcohols and glycols to their corresponding carboxylates, upon reaction with primary amine compounds and epoxy resin compounds, results in an epoxy resin surfactant composition which is too viscous due to chain growth from the dicarboxylate-diamine reaction and a dispersion whose stability is not optimal due to the formation of a large number tertiary amine groups which autocatalyze further epoxy-hydroxyl reactions, and a partial loss in surfactancy due to the tendency of chain scission during the oxidation reaction as the degree of conversion rises above 95%.

Accordingly, there is provided a process for preparing a polycarboxylic acid composition comprising reacting a polyoxyalkylene polyol composition with a stable free radical nitroxide in the presence of an $NO_x$ generating compound under conditions sufficient to convert from 60% to no more than 95% of the polyoxyalkylene polyol composition.

There is also provided a process for preparing a polycarboxylic acid composition comprising reacting a polyoxyalkylene polyol composition with a stable free radical nitroxide in the presence of $NO_x$ and water as a solvent, under conditions sufficient to convert from 60% to no more than 95% of the polyoxyalkylene polyol composition.

There is further provided a process for preparing a polycarboxylic acid composition comprising reacting a polyoxyalkylene polyol composition with a stable free radical nitroxide having the formula:

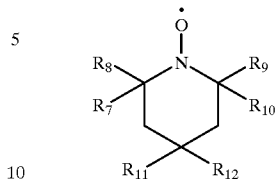

wherein $R_7$, $R_8$, $R_9$, $R_{10}$ are each independently hydrogen or an alkyl, aryl, or aralkly group having from 1 to 15 carbon atoms, and at least one of $R_{11}$ and $R_{12}$ are hydrogen and the other is —OH, —NHR', —OR', —ONHR', or —NHCOR', wherein R' is an alkyl, aryl, alkaryl, or alicyclic group;
in the presence of $NO_x$, under conditions sufficient to convert from 60% to no more than 95% of the polyoxyalkylene polyol composition.

DETAILED DESCRIPTION OF THE INVENTION

Several embodiments of the invention are described herein. Any of the elements of the invention may comprise any one or a combination of the features disclosed the several embodiments described herein. Further, as used throughout the specification, including the claims, the word comprise includes the elements expressly set forth but is not limited to those elements, and is synonymous with including and not limited to, in contrast to the phrase, "consisting of."

The average molecular weights of the polyoxyalkylene polyol compositions as used throughout represent a distribution of compounds with a varying number of oxyethylene units, n or o and/or oxypropylene or oxybutylene units, m.

Generally, the quoted number of units is the whole number closest to the statistical average, and the peak of the distribution. Positive real number as used herein refers to a number which is positive and includes integers and fractions of integers.

The process of the invention for preparing a polycarboxylic acid composition comprises reacting a polyoxyalkylene polyol composition with a stable free radical nitroxide in the presence of an $NO_x$ generating compound under conditions sufficient to convert from 60% to no more than 95% of the polyoxyalkylene polyol composition.

The percentage of conversion as used herein means the percentage of functional end groups of the starting materials converted to a different functional end group, as measured by C-13 NMR analysis. Alternatively, the percent conversion may be calculated by base titration with 0.1N methanolic KOH, from which the acid equivalent weight is calculated by the equation:

Acid number (mgKOH/g sample)=56,100/Acid equivalent weight followed by the method for calculating the degree of conversion as follows:

$$\% \text{ conversion} = \frac{\text{OH Equivalent Weight PEG Starting Material}}{\text{Acid Equivalent Weight}}$$

The degree, or percent, conversion is a measurement taken from the final reaction product after the conversion reaction is complete. In the event the reaction product is not isolated, then the degree of conversion is a measurement taken from the converted reaction product immediately prior to reacting the converted reaction product with a different reagent and after removal of the $NO_x$ generating compound from the reaction mass.

As an illustration, 75% conversion of a polyoxyalkylene polyol composition means that 75% of the polyoxyalkylene polyol composition hydroxyl groups are converted to a different functional end group. The sample for measurement is taken from the reaction mass after removing the $NO_x$ generating compound and before reacting the converted polyoxyalkylene polyol composition with an amine reagent.

Selectivity is measured as the percentage of polyoxyalkylene polyol species converted to species having carboxyl end groups relative to the percentage of all species converted. For example, 95% selectivity toward the carboxyl end group species means that of the number of polyoxyalkylene polyol composition converted, 95% converted toward the carboxyl end group species.

For the reasons noted above, we have discovered that conversion of polyoxyalkylene polyol composition starting material in excess of 95% is undesirable. A degree of conversion below 60% is provides an insufficient number amidoamine sites, thereby reducing the average equivalent weight and impairing the ability of the surfactant to provide a stable dispersion of epoxy resin in water. Preferably, the process of the invention converts from 75% to no more than 90% of the polyoxyalklyene polyol composition, and more preferably, the process of the invention converts from 80% to 88% of the polyoxyalkylene polyol composition.

In a more preferred embodiment, the degree of conversion is conducted with high selectivity toward carboxyl end groups to manufacture the polycarboxylic acid composition of the invention. Preferably, from 60 to no more than 95%, more preferably from 75 to no more than 90%, most preferably from 80 to 88% of the hydroxyl groups in the polyoxyalkylene polyol composition are converted to a carboxyl end groups. The remainder of the polycarboxylic acid composition comprises species bearing unconverted hydroxyl groups and ester groups. In a preferred embodiment, the polycarboxylic acid composition contains less than 1 wt. % of aldehyde, formate, or acetal termination, and more preferably non-detectable amounts by C13 NMR analysis. In a further preferable embodiment, there is provided a polycarboxylic acid composition made by the process of the invention having an acid number of at least 5.6 mgKOH/g, and an average acid functionality ranging from 0.90 to 1.8, more preferably ranging from 1.2 to 1.8. In another embodiment, the polycarboxylic acid composition has an acid number ranging from 5.6 to 40 mgKOH/g, more preferably 10 to 25 mgKOH/g. At acid numbers higher than 40, the stability of water borne epoxy resin dispersion degrades and the dispersion will generally gel within a few weeks.

There exist one or more of several reaction conditions and reagents which may be manipulated to partially convert the polyoxyalkylene polyol composition. These conditions include time, temperature, pressure, the selection of agents participating in the oxidation process, their relative amounts, and their combinations.

A suitable stable free radical nitroxide catalyst remains active long enough to oxide a polyoxyalkylene polyol composition and then deactivates when the desired degree of conversion is obtained or shortly thereafter. In the absence of an appropriate stable free radical nitroxide catalyst, merely shutting off the flow of air or oxygen to a reaction mass undergoing a conversion reaction using 2,2,6,6-tetramethyl-piperidine-1-oxyl (TEMPO) as the nitroxide catalyst in the presence of an $NO_x$ source is insufficient to discontinue the conversion reaction, for the reason that the nitroxide catalyst is not deactivated and the presence of the $NO_x$ compound continues to act as a source of oxygen. While stripping off the $NO_x$ generating compound from the reaction mass after the flow of air or oxygen is shut off deprives the reaction mass from most of its oxygen supply, this is also not an adequate solution because stripping takes time, during which conversion reactions continue, and residual air or oxygen contacting the reaction mass, if exposed to the atmosphere, continues to provide a source of oxygen for the active nitroxide catalyst. Accordingly, it is desirable to use a stable free radical nitroxide catalyst whose activity is deactivated chemically or physically at the desired time.

The most convenient method of deactivation which avoids any substantial side reactions and/or the expense of a chemical deactivation agent, is to select a free radical nitroxide catalyst which may be deactivated by physical means, such as temperature. More preferably, such a catalyst should be sufficiently active at reaction temperatures to attain the desired degree of conversion of the particular polyoxyalkylene polyol composition selected in a short time frame to increase reactor utilization.

As an example, selection of a stable free radical nitroxide which deactivates at room temperature would not be an appropriate catalyst selection for a polyoxyalkylene polyol composition which converts slowly, if at all, at room temperature. Likewise, the catalyst deactivation temperature should not be so high that significant chain scission of the reaction product or unconverted polyoxyalkylene polyol composition occurs as one approaches, reaches, and exceeds the catalyst deactivation temperature. An optimal selection of a stable free radical nitroxide catalyst would be one which remains active at the conversion temperatures selected and deactivates at a temperature below the temperature at which chain scission of the reaction product occurs, and more preferably, close to the conversion temperature to quickly conduct and conclude the catalyst deactivation reaction.

The term "stable free radical nitroxide" as used herein shall mean a free radical nitroxide that can be prepared by conventional chemical methods and will exist long enough to be used in a subsequent chemical reaction or examined in a static system by normal methods of spectroscopy. Generally, the stable free radical nitroxides of the present invention have a half life of at least one year. The term "stable free radical" shall also be understood to include the precursor to a stable free radical from which the stable free radical may be produced in-situ.

The stable free radical nitroxides, as used in the present process, are precursors to catalysts, i.e., oxoammonium salts, active for the oxidation of alkanols to the corresponding acids. These catalysts are generated in situ by the oxidation of a stable free radical nitroxide to an oxoammonium salt. The stable free radical nitroxide can be obtained by the oxidation of secondary amines or hydroxylamines.

A preferable stable free radical nitroxide used in the partial oxidation process of the invention has the formula A:

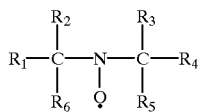

wherein (1) each of R1, R2, R3 and R4 is each independently an alkyl (including a cycloalkyl), aryl or heteroatom substituted alkyl group having 1 to about 15 carbon atoms; R5 and R6

(i) each is an alkyl group having 1 to about 15 carbon atoms provided that R1–R6 are not all alkyl groups, or a substituted alkyl group having 1 to about 15 carbon atoms wherein the substituent is hydrogen, cyano, —CONH2, —OCOCH, OCOC2H5, carbonyl, alkenyl wherein the double bond is not conjugated with the nitroxide moiety, or —COOR wherein R of the —COOR group is alkyl or aryl, or (ii) together form part of a ring that contains 5 carbon atoms and up to two heteroatoms of O or N, or (2) the

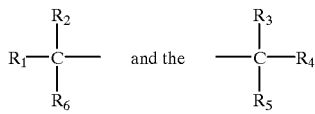

moieties individually are aryl such as diphenylamine, phenyl tertiary butylamine, 3,3'-dimethyldiphenylamine, 2,2'-dichlorodiphenylamine and the like, or together form a bicyclic ring with the proviso that the group directly adjacent to the N—O moiety is a bridgehead C—H, or a fully alkylated carbon. These compounds may be substituted with substituents which do not interfere with the reaction.

Preferably, $R_1$ through $R_4$ are methyl, ethyl, or propyl groups. The heteroatom substituents may include halogen, oxygen, nitrogen and the like. Examples of compounds having a structure in which R5 and R6 form part of the ring are piperidinyl-1-oxyls and pyrrolidin-1-oxyls.

A more preferred free radical nitroxide is represented by the formula B:

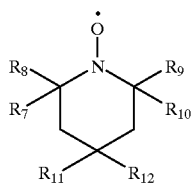

wherein $R_7$, $R_8$, $R_9$, $R_{10}$ are each independently hydrogen or an alkyl, aryl, or aralkly group having from 1 to 15 carbon atoms, $R^{11}$ or $R^{12}$ is —OH, OR', —OCOR', —NHR', ONHR', or —NHCOR', —OSO$_3$H, —0-polymer, and the like, wherein R' is an alkyl, aryl, alkaryl, or alicyclic group.

In one embodiment of the invention, $R^{11}$ or $R^{12}$ is —OH, and the other $R^{11}$ or $R^{12}$ is hydrogen. In this embodiment, the free radical nitroxide is represented by the formula C:

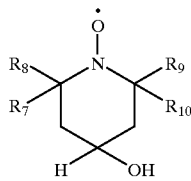

In another embodiment, $R^{11}$ or $R^{12}$ is —NHCOCH$_3$ or —ONHCH$_3$, and the other $R^{11}$ or $R^{12}$ is hydrogen.

In another embodiment, the R7–10 groups are alkyl groups, such as methyl, ethyl, propyl, and butyl or t-butyl, preferably methyl, and $R_{11}$ or $R_{12}$ is —OH, as represented by Formula D:

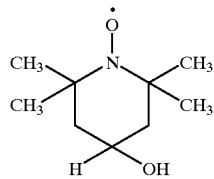

The composition to be oxidized is a polyoxyalkylene polyol composition. The process of the invention is not limited to any particular polyoxyalkylene polyol composition. Any polyoxyalkylene polyol composition may be partially oxidized, including those having a number average molecular weight from 200 to 10,000 and an average OH functionality ranging from 0.5 to 8. However, we have found that it is particularly desirable to partially oxide a certain polyoxyalkylene polyol composition because of the advantages such a composition has providing a stable water dispersed epoxy resin composition.

Accordingly, in a preferred embodiment, the polyoxyalkylene polyol composition contains a compound or a mixture of compounds represented by the following formulas E and F:

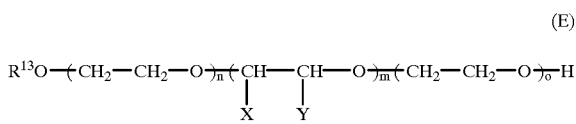

(E)

or

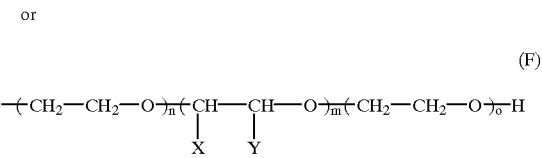

(F)

wherein $R^{13}$ is an alkyl, aryl, aryalkyl, or cycloaliphatic or aromatic group having 2 to 18 carbon atoms optionally containing non-reactive oxygen or at most an average of 4 secondary and/or tertiary nitrogen atoms per structure in the backbone group or mixtures thereof, X and Y are independently a hydrogen, methyl or ethyl group with the provision that if X is methyl or ethyl, Y is hydrogen or if Y is methyl or ethyl, X is hydrogen, and n+m+o is a real number from 40 to 400, and n+o is a real number from 40 to 400.

While the initiators are not shown in the above formulae, it is understood that the above formulae include an initiator molecule if the compound is manufactured as such. Suitable initiators include the alcohol of the $R^{13}$ residue, or glycols such as ethylene glycol, propylene glycol, 1,4 butanediol, and the like.

Preferably, $R^{13}$ is a methyl, ethyl, propyl, butyl, or t-butyl group, more preferably methyl. Polyoxyalkylene polyol compositions having a number average molecular weight ranging from 2000 to 7000, preferably from 2000 to about 6000, are particularly preferred as surfactant precursors to stably disperse epoxy resins in water.

In this embodiment and in an independent embodiment, the polyoxyalkylene polyol composition preferably has an average OH functionality ranging from 1.05 to 2.2 meqKOH/g, more preferably having a average OH functionality ranging from 1.1 to 2 meqKOH/g, most preferably having an average OH functionality ranging from 1.5 to 2.0 meqKOH/g. Those polyoxyalkylene polyol compositions having an average OH functionality of less than 1.05, such as 1, fail to provide any species which can promote chain growth, while those polyoxyalkylene polyol compositions having an average OH functionality of greater than 2.2 contain too many species which promote chain growth as well as crosslinking sites in subsequent reactions with polyamines and epoxy resins. In this embodiment, as a starting point, the viscosity of the oxidized and reacted polyoxyalkylene polyol composition, as well as the number of tertiary amine sites produced by the reaction of the epoxy resin with the amidoamine made by reacting a polyamine with the oxidized polyoxyalkylene polyol composition, should be controlled by oxidizing a polyoxyalkylene polyol composition having an appropriate functionality within the above stated range.

In another embodiment, at least 80 mole %, more preferably at least 90 mole %, and most preferably at least 95 mole % of the species in the polyoxyalkylene polyol composition are terminated with primary hydroxyl groups. In a further embodiment, a polyoxyalkylene polyol composition is used which is theoretically terminated with 100% of primary hydroxyl groups, e.g., by termination with ethylene oxide units.

In yet a further embodiment of the invention, at least 80 mole %, more preferably at least 90 mole %, most preferably at least 95 mole % of the oxyalkylene groups are derived from ethylene oxide units. In another embodiment of the invention, m=0.

The NOx generating compound in the present process is typically selected from the group consisting of an alkali metal nitrosodisulfonate, nitric acid and mixtures thereof, with nitric acid being preferred. However, any compound which serves to generate NOx during the course of the reaction and which does not interfere with the reaction would be suitable. While not wishing to be bound by any particular theory, it is believed that nitrogen oxides (NOx) are generated in the reaction and are required to generate the active catalytic species.

The alkali metal nitrosodisulfonate suitable for use as a NOx generating compound can be any alkali metal nitrosodisulfonate although potassium nitrosodisulfonate is preferred. As used herein, the term "alkali metal" is used as a descriptor of the elements Group IA of the Periodic Table of the Elements (Li, Na, K, Rb, Cs, Fr). The alkali metal nitrosodisulfonate is typically dissolved in water prior to being added to the reaction mixture although it can be added as a solid after all of the other reactants have been added.

As used herein, the term "nitric acid" refers to nitric acid, fuming nitric acid or nitrous acid generated by contacting alkali metal nitrite with mineral acid. Nitric acid can also be generated by contacting alkali metal nitrate with mineral acid. The nitric acid suitable for use in the present invention typically has a concentration in the range of from about 50 percent to about 100 percent, preferably about 70 percent. Generally, an amount of nitric acid in the range of from about 5 mole percent to about 1,000 mole percent, basis the moles of starting polyoxyalkylene polyol composition utilized. The nitric acid is typically added to the reaction mixture after all of the other reactants have been added.

In a preferred embodiment, an oxidant is also added as a reactant. In general, when catalytic amounts of the NOx generating compound are used, the addition of an oxidant is preferred, whereas when stoichiometric amounts of the NOx generating compound are used, an oxidant is not needed. The oxidants suitable for use in the instant invention are those compounds which are capable, in the presence of nitric acid, of oxidizing the stable free radical nitroxide to the oxoammonium salt. Suitable oxidants include oxygen-containing gases such as pure oxygen and oxygen in air. Whereas pure oxygen can be preferred to accomplish the desired conversion, the oxygen can also be diluted with an inert gas such as nitrogen, helium, argon, or other similar gas. While air can be used as the oxidant, the reaction rate is much slower. For purposes of increasing the reaction rate, higher $O_2$ flow rates are desirable to maintain the pressure inside the reaction vessel at the desired reaction pressure described below. In a preferred embodiment, pure oxygen is used as the oxidant and it is bubbled or injected into the reaction solution.

The reaction is preferably carried out in the presence of a solvent. When the molecular weight is such that the polyoxyalkylene polyol composition is a solid or a viscous liquid, a solvent in which the solid or highly viscous alkoxyalkanol reactant is soluble should be added. When the polyoxyalkylene polyol composition is liquid at ambient temperature, the polyoxyalkylene polyol composition can be oxidized neat.

A preferred solvent is one in which the polyoxyalkylene polyol composition is soluble and boils above the decomposition temperature of the catalyst. While low boiling solvents can be used, the reaction vessel must be highly pressurized. In one embodiment, the solvent boils at 70° C. or higher, more preferably at 80° C. or higher, most preferably at 90° C. or higher. In another embodiment, the preferred solvent also chemically interferes with the activity of the catalyst at temperatures higher than the conversion temperatures in order to assist in the rapid decomposition and deactivation of the catalyst. Suitable examples of such solvents include water and tetramethylammonium hydroxide, preferably water.

Water is preferred over other volatile solvents from a chemical and physical perspective. For example, a 4—OH substituted free radical nitroxide chemically decomposes faster in the presence of water than in carbon tetrachloride. Water is also more suitable than many other chlorinated or volatile solvents because the boiling point of water is high. To enhance reactor utilization and shorten the reaction time, it is desirable to conduct the oxidation reaction at higher temperatures. Lower boiling solvents cannot be reacted at higher temperatures at moderate reactor pressure, requiring the solvent to be stripped off at the conclusion of the reaction before the temperature can be sufficiently elevated to decompose the catalyst. With water as a solvent, the temperature can be elevated above the oxidation reaction temperature but below the boiling point of water prior to stripping off the water solvent, thereby quickly decomposing and deactivating the catalyst without the need to first strip off the solvent.

Optionally, other conventional solvents can be used in combination with the preferred solvents or in place of the preferred solvents. These include dichloromethane, acetonitrile, tertiary butyl alcohol glyme, carbon tetrachloride, monoglyme, and mixtures thereof. Preferably, however, the reaction is conducted at least in the presence of water as a solvent.

The weight ratio of solvent to the polyoxyalkylene polyol composition reactant is typically in the range of from about 1:1 to about 1:100, and preferably in the range of from about 1:1 to about 1:10.

In a preferred embodiment, the solvent comprises water in a weight ratio of water to other solvent ranging from 1:1 to 100:1, and more preferably solely water is used as the solvent. The amount of water based on all ingredients used in the reaction ranges from 2 wt. % to 20 wt. %, and more preferably from 5 to 15 wt. %. Water added as a solvent does not include the amount of water which may be present in nitric acid from a manufacturer.

The amounts and concentrations of the reactants utilized in the process of the instant invention can vary within wide ranges. The amount of stable free radical nitroxide is typically in the range of from about 1 mole percent to about 500 mole percent, preferably from about 20 mole percent to about 200 mole percent, based upon the number of moles of starting polyoxyalkylene polyol composition. Generally, the amount of $NO_x$ generating compound used, such as nitric acid, is in the range of from about 5 mole percent to about 1,000 mole percent, more preferably from 40 to 400 mole percent, based on the number of moles of polyoxyalkylene polyol composition.

The process of the present invention is typically conducted under mild conditions, with good results being obtained using a temperature in the range of from about 0° C. to less than the deactivation (also decomposition) temperature of the catalyst. The deactivation temperature of the catalyst is generally known from the manufacturer of the free radical nitroxide, and its decomposition temperature under reaction conditions can then be calculated from the decomposition conditions specified by the manufacturer. Alternatively, the deactivation temperature of the catalyst can be measured as the temperature, under the reaction conditions employed, at which percentage of conversion from hydroxyl groups to carboxyl groups in the reactor decreases to 1% or less. The deactivation temperature can be measured to within ±3° C. For example, if 65% of the hydroxyl groups in a polyoxyalkylene polyol composition are converted to carboxyl end groups at 55° C. and 55 psig, the deactivation temperature of the catalyst is the lowest temperature, or the lowest point in a narrow band of temperatures, at which less than 1% of the hydroxyl groups are converted to carboxyl groups, regardless of how much more time the reaction is allowed to proceed. The deactivation temperature is generally experimentally detected as a narrow band of temperatures because the heat transfer to all moles of the catalyst is neither immediate nor uniform in most reaction vessels.

Preferably, the conversion reaction is conducted at one or more temperatures ranging from 20° C. to less than 60° C., and more preferably, about 40° C. to less than 60° C., most preferably from 50° C. to 57° C.

Reaction pressures are not critical, although higher pressures desirably result in increased reaction rates. Pressures in the range of from about atmospheric pressure up to about 100 psig, more preferably from 20 psig to 70 psig, more preferably from 40 to 60 psig. In one embodiment, the reaction is conducted under any one or more pressures ranging from 50 psig to 57 psig.

The polyoxyalkylene polyol composition undergoes reaction for an amount of time effective for the desired degree of conversion. The particular amount of time is not limited, but it is desired to conduct the partial conversion to the desired degree within a short period of time. In the process of the invention, from 60 to less than 95% of the polyoxyalkylene polyol composition can be converted advantageously within 3 hours, and more preferably between 1 to 2 hours. These short reaction times are made possible by increasing the reaction temperature and pressure in the vessel in the presence of a solvent, such as water, having a boiling point higher than the decomposition temperature of the catalyst.

To complete the partial conversion of the polyoxyalkylene polyol composition, the catalyst must be deactivated to prevent the conversion reactions from continuing. Accordingly, the flow of air or oxygen is shut off, and the temperature is raised to the deactivation temperature of the catalyst or higher, and the $NO_x$ generating source is stripped off at the higher temperature along with any solvent present, such as water. Any available means for removing the $NO_x$ generating source and optional solvent is suitable, such as conventional distillation techniques. To prevent the carboxylic acid composition from undergoing chain scission reactions at higher temperatures, it is preferred that the stripping of the $NO_x$ generating source and the solvent be conducted at reduced pressure, such as from 2 mmHg to 14 mmHg. Each of these steps may be conducted simultaneously or sequentially in any order. For safety considerations, it is preferred to shut off the flow of air or oxygen first, followed by raising the temperature and reducing the pressure to simultaneously conduct the catalyst deactivation and the stripping operations simultaneously.

In an embodiment of the invention, there is provided a process for preparing a polycarboxylic acid composition comprising:

a. contacting a polyoxyalkylene polyol composition with a stable free radical nitroxide comprising a nitroxide having the formula:
wherein the $R^{11}$ or $R^{12}$ is —OH, —OR', —OCOR', —NHR', —ONHR', or —NHCOR', and R' is an alkyl, aryl, alkaryl, or alicyclic group; and an $NO_x$ generating source; and optionally water; and b) at a temperature of less than the deactivation temperature of the free radical nitroxide, converting the polyoxyalkylene polyol composition in the presence a flow of air or oxygen; and c) completing the conversion by discontinuing the flow of air or oxygen, and raising the temperature to at least the deactivation temperature of the free radical nitroxide; whereby 60% to no more than 95% of the polyoxyalkylene polyol composition is converted.

Preferably, step b is conducted at 60° C. or less, and step c is conducted at greater than 60° C. More preferably, the conversion is conducted in the presence of water, and water and the $NO_x$ generating source are removed in step c by distillation.

To complete the conversion, the temperature in this embodiment is raised and maintained above 60° C., preferably within a range of 70° C. to 110° C. for a period of 15 minutes to 2 hours, which will be sufficient to decompose and deactivate the preferred stable free radical catalysts. More preferably, the temperature is raised and maintained within a range of 80° C. to 100° C. for a period of 0.5 hours to 1.5 hours at one more pressures less than the pressure used in the conversion reaction, preferably from 2 mmHg to 14 mmHg.

It is to be understood that the conversion reaction in step b may continue to some extent in step c as the temperature is raised and the $NO_x$ generating source and optional solvent are stripped off. While the process of the invention quickly deactivates the catalyst, the conversion reaction may continue to a minor extent during the heat-up cycle until all of the catalyst molecules have been decomposed. The final product, the polycarboxylic composition, will be the reaction product of having converted from 60 to less than 95% of the polyoxyalkylene polyol composition.

The process of the instant invention can be carried out either batchwise or continuously, using a stirrer equipped reactor or other well known contacting technique to achieve adequate mixing. Preferred reaction conditions, e.g., temperature, pressure, flow rates, etc., vary somewhat depending on the specific nitroxide utilized and on the concentration of the nitroxide.

The process of the instant invention can be carried out in a variety of ways. For example, the polyoxyalkylene polyol composition and the stable free radical nitroxide may be added to the reaction vessel, followed by the addition of the $NO_x$ generating source, such as nitric acid, and then injecting a flow of air or oxygen through the reaction mass. The polyoxyalkylene polyol composition may be added neat to the reaction vessel, or may be dissolved in a suitable solvent in the reaction vessel, or pre-dissolved in a suitable solvent and adding the dissolved polyoxyalkylene polyol composition into the reaction vessel. Upon completion of the conversion, the polycarboxylic acid composition may be removed from the reaction vessel and isolated for future use, or it may remain in the reaction vessel for further reaction with other added reagents, or it may be pumped or otherwise removed from the conversion reaction vessel to a second vessel to carry out reactions with other reagents, leaving the conversion reaction vessel available to conduct further conversion reactions with fresh polyoxyalkylene polyol composition feed.

If desired, the polycarboxylic acid composition can be purified by a number of conventional means such as water washing, solvent extraction, or discoloration with a reducing agent.

Once the partial conversion reaction is complete, the resulting polycarboxylic acid composition can be used for its intended purpose. In one embodiment, the polycarboxylic acid composition is reacted with a polyamine compound to make an amidoamine composition, followed by reaction with an epoxy resin to manufacture a water dispersible epoxy resin surfactant composition.

Accordingly, there is provided an aqueous dispersion of an epoxy resin comprising:

a) water;

b) at least one epoxy resin having a functionality of greater than 0.8 epode group per molecule; and c) from 0.1 to 20 weight percent, based on the weight of the epoxy resin, of at least one epoxy-functional surfactant prepared by reacting one or a combination of amidoamines having the structures:

an amount effective to provide resin emulsification, with at least one epoxy resin having a functionality of from greater than 0.8 epode group per molecule, in an amine to epoxy equivalent ratio of at least 1:2, preferably from 1:6 to 1:500.

The ratio of (I) to (II) by weight is in the range of 100:0 to 0:100, the ratio of (I) to (III) by weight in the range of 100:0 to 0:100, and the ratio of (II) to (III) by weight in the range of 100:0 to 0:100.

By using a certain epoxy-functional surfactant, an effective aqueous epoxy resin dispersion can be formed having an average particle size of generally less than 1 $\mu$ that has good shelf-life and handling properties. These dispersions are stable, retaining consistent viscosity and epoxy functionality for suitable periods of time. These dispersions can be obtained at higher inversion temperatures and higher resin concentrations by using these surfactants, resulting in shorter preparation time, greater ease of handling and higher temperature storage stability.

Epoxy-Functional Surfactant

The epoxy-functional surfactant useful can be prepared by reacting (i) at least one amidoamine of the above formulae with at least one epoxy resin having a functionality greater than 0.8 epode group per molecule. The epoxy-functional amidoamine surfactant preferably has a molecular weight within the range of from 1,700 to 40,000, preferably to 20,000. In a preferred embodiment, the ratio of n+o to m is in the range of 100:1 to 55:45.

In formula (I), preferably m is a real number from 0 to 70 and n and o are independently a real number from 5 to 395. In formula (II), preferably m is a real number from 0 to 70, n is a real number from 0 to 395, and o is a real number from 0 to 400, more preferably from 20 to 380. In formula (III), preferably m is a real number from 0 to 70, n is a real number from 0 to 395, and o is a real number from 0 to 400, more preferably from 20 to 380. In all of the above formulae (I), (II), and (III), n+o must be a real number in an amount effective to provide resin emulsification which is typically at least 15, preferably at least 35. In one preferred embodiment, m is 0.

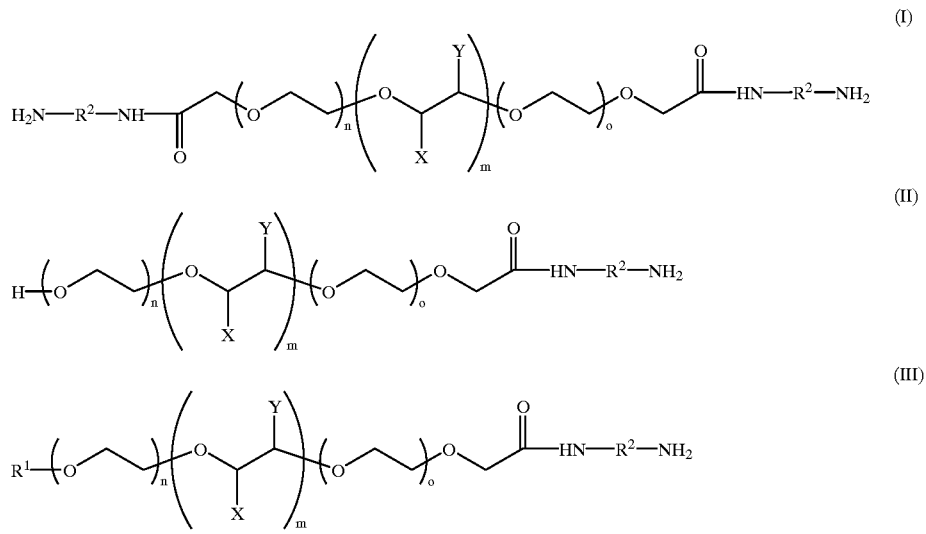

wherein $R^1$ is the same as $R^{13}$ above, and X, Y, n, m, and o are as represented above, except that n+o is a real number in In one embodiment, the surfactant can be prepared by reacting amidoamine of structures (I) and (II) in a ratio of (I)

to (II) by weight in the range of 99:1 to 1:99, preferably in the range of 20:80 to 80:20, and at least one epoxy resin. In another embodiment, the surfactant can be prepared by reacting amidoamine of structures (II) and (III) in a ratio of (II) to (III) by weight in the range of 99:1 to 1:99, preferably in the range of 20:80 to 80:20, and at least one epoxy resin. In yet another embodiment, the surfactant can be prepared by reacting amidoamine of structures (I) and (III) in a ratio of (I) to (III) by weight in the range of 99:1 to 1:99, preferably in the range of 20:80 to 80:20, and at least one epoxy resin. Further, the surfactant can be prepared by reacting amidoamine of structures (I), (II) and (III) in an amount of 4 to 98 percent by weight of (I), 1 to 95 percent by weight of (II), and 1 to 95 percent by weight of (III) with an epoxy resin.

The amidoamine is contacted with the epoxy resin under conditions effective to react the amine group and the epode group. Typically, the equivalent ratio of the amine to epoxy is at least 1:2, preferably in the range of from 1:6 to 1:500, more preferably in the range of from 1:6 to 1:30. The reaction is typically carried out at a temperature from ambient temperature to an elevated temperature sufficient to react the amine group and the epode group preferably in the range of from 50° C. to 150° C. for a time effective to produce the reaction products. The progress of the reaction can be monitored and targeted to produce the desired product by measuring the amine equivalent weight and the epoxy equivalent weight of the reactant mixture. Generally, the reaction mixture is heated until the epoxy equivalents equal to the amine equivalents added are consumed which is generally one hour or greater.

More than one epoxy resin can be reacted with the amidoamine. For example, the amidoamine can be reacted first with an monoepoxide resin and then with a diepoxy resin, or reacted with a diepoxy resin and then with a monoepoxide. In another example, the epoxy resin can be reacted with a novolac epoxy resin and a diepoxy resin stepwise or at the same time in any order.

If desired the surfactant can be recovered from the reaction mixture or made "in-situ." To provide the surfactant in-situ in the desired epoxy resin component, the amidoamine can be reacted into the desired epoxy resin component. The in-situ method is preferred providing an epoxy-functional amidoamine surfactant where the residue of the epoxy resin (hydrophobic moiety) which was reacted with the amidoamine is the same as the bulk epoxy resin that is dispersed. The residue of the epoxy resin (hydrophobic moiety) is the same as the bulk epoxy resin when the hydrophobic moiety from the surfactant has the same IR spectrum as the IR spectrum of the bulk epoxy resin. When the surfactant is recovered, the equivalent ratio of the amine to epoxy is preferably within the range of from 1:30 to 1:6.

For the in-situ method, the epoxy resin should be present in an amount sufficient to provide unreacted epoxy resin component and the surfactant adduct. Further, to provide the surfactant in-situ in an advanced epoxy resin, the amidoamine can be reacted into the mixtures of diepoxy resins such as diglycidyl ethers of dihydric phenols and dihydric phenols during advancement reaction or can be reacted into the resin after the advancement reaction. In an advancement reaction, generally the diepoxy resin and the dihydric phenol are allowed to react in a molar ratio of 7.5:1 to 1.1:1 in the presence of an advancement catalyst, producing an advanced epoxy resin having a weight per epoxy value of from 225 to 3,500. Typically, 0.1 to 15 weight percent of the amidoamine, based on epoxy resin or epoxy resin and phenolic compound, is used. It is preferred to add the amidoamine after the advancement reaction, whether the advanced products are separated or as is.

The preferred amidoamine is prepared by reacting an the polycarboxylic acid composition containing one or more compounds of the formula:

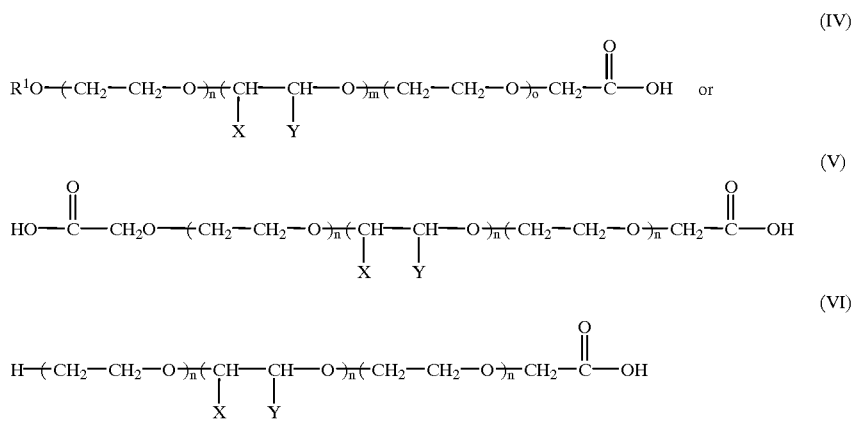

wherein $R^1$ is the same as $R^{13}$ above, and X, Y, n, m, and o are as represented above with respect to the manufacture of the epoxy resin surfactant, with a primary amine compound.

One embodiment of the preferred amidoamine can be prepared by reacting a polyamine compound with a polycarboxylic acid composition comprising an acid-terminated polyalkyleneglycol methylether having the formula

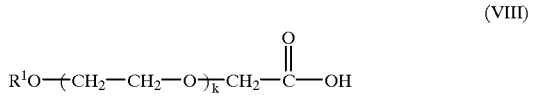

wherein $R^1$ is as defined above, preferably methyl, and k is a positive real number from 40 to 400, and at least one diamine in an amine to acid equivalent ratio of 6:1 to 25:1.

Preferred diamine has the formula:

wherein $R^2$ is as defined above. Examples of suitable diamines include for example, m-xylylenediamine, 1,3- bisaminomethylcyclohexane, 2-methyl-1,5-pentanediamine, 1-ethyl-1,3-propanediamine, ethylenediamine, diethylenetriamine, triethylenetetramine, polyoxypropylenediamines, 2,2(4),4-trimethyl-1,6-hexanediamine, isophorone diamine, 2,4(6)-toluenediamine, 1,6-hexanediamine, and 1,2-diaminocyclohexane.

The polycarboxylic acid composition can be produced by partial oxidation of a polyoxyalkylene polyol composition as described above.

The epoxy resins used in producing the surfactant can be any reactive epoxy resin having a 1,2-epoxy equivalency (functionality) preferably, on the average, greater than 0.8 epode group per molecule, in some application preferably at least 1.5, to preferably 6.5 epode groups per molecule. The epoxy resin can be saturated or unsaturated, linear or branched, aliphatic, cycloaliphatic, aromatic or heterocyclic, and may bear substituents which do not materially interfere with the reaction with the carboxylic acid. Such substituents can include bromine or fluorine. They may be monomeric or polymeric, liquid or solid, but are preferably liquid or a low melting solid at room temperature. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include monoepoxides, diglycidyl ethers of dihydric compounds, epoxy novolacs and cycloaliphatic epoxies. Generally epoxy resins contain a distribution of compounds with a varying number of repeat units. Further, the epoxy resin can be a mixture of epoxy resins. In one such embodiment, the epoxy resin can comprise a monoepoxide resin and a di- and/or a multi-functional epoxy resin, preferably an epoxy resin having a functionality of from 0.7 to 1.3 and an epoxy resin having a functionality of at least 1.5, preferably at least 1.7, more preferably from 1.8 to 2.5. The mixture can be added or reacted with the amidoamine stepwise or simultaneously.

Preferred epoxy resins include, but are not limited to, those represented by the formula:

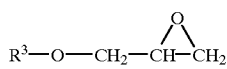

where

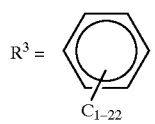  (IX)

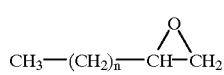 (X)

where n=5–20.

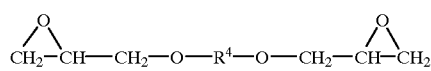 (XI)

-continued

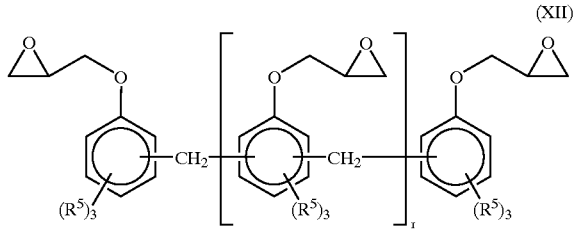 (XII)

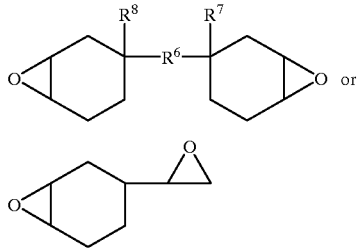 (XIII)

wherein r is a real number from 0 to 6, $R^3$ is a linear or branched $C_1$–$C_{22}$ alkyl group, an arylalkyl group, an alkylsilane or a halogenated aryl or alkyl group, $R^4$ is divalent aliphatic, divalent cycloaliphatic, divalent aryl, or divalent arylaliphatic group, preferably $R^4$ contains 8 to 120 carbon atoms, $R^5$ is independently a hydrogen or a $C_1$–$C_{10}$ alkyl group, $R^6$ is a divalent aliphatic group optionally containing ether or ester group(s) or together with $R^7$ or $R^8$ form a spiro ring optionally containing heteroatoms, and $R^7$ and $R^8$ are independently hydrogen or $R^7$ or $R^8$ together with $R^6$ form a spiro ring optionally containing heteroatoms such as oxygen, preferably $R^6$ contains 1 to 20 carbon atoms. The term aliphatic or cycloaliphatic includes compounds having oxygen and/or sulfur atoms on the backbone. For example, $R^4$ can be a divalent cycloaliphatic group having the formula

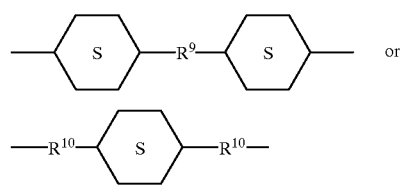

wherein $R^9$ and $R^{10}$ are each independently an alkylene group, or a divalent arylaliphatic group having the formula

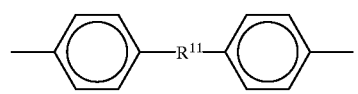

wherein $R^{11}$ is an alkylene group.

Preferably the epoxy resin is a difunctional epoxy resin such as a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl) propane (bisphenol-A); 2,2-bis(4-hydroxy-3-tert-butylphenyl) propane; 1,1-bis(4-hydroxyphenyl)ethane; 1,1-bis(4-hydroxyphenyl) isobutane; bis(2-hydroxy-1-naphthyl)

methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols includes advancement products of the above diglycidyl ethers of dihydric phenols with dihydric phenols such as bisphenol-A, such as those described in U.S. Pat. Nos. 3,477,990 and 4,734,468, which are herein incorporated by reference.

Diglycidyl ethers of hydrogenated dihydric phenols can be produced, for example, by hydrogenation of dihydric phenols followed by glycidation reaction with an epihalohydrin in the presence of a Lewis acid catalyst and subsequent formation of the glycidyl ether by reaction with sodium hydroxide. Examples of suitable dihydric phenols are listed above.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. Examples of preferred aliphatic glycidyl ethers include those corresponding to the formulas:

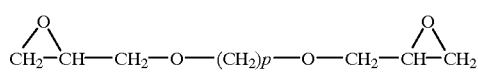

(XIV)

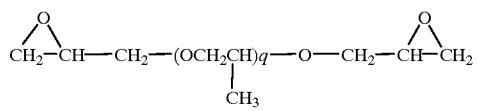

(XV)

wherein:

q is an integer from 2 to 12, preferably from 2 to 6; and q is an integer from 4 to 24, preferably from 4 to 12.

Examples of suitable aliphatic glycidyl ethers include for example, diglycidyl ethers of 1,4 butanediol, neopentyl glycol, cyclohexanedimethanol, hexanediol, polypropylene glycol, and like diols and glycols; and triglycidyl ethers of trimethylol ethane and trimethylol propane.

Examples of suitable monoepoxide include for example the glycidyl ethers or phenol, t-butyl phenol, cresol, nonyl phenol, and aliphatic alcohols. Other suitable monoepoxide include glycidated monoacids and epoxides formed from alpha olefins and glycidoxyalkylalkoxysilanes.

Epoxy novolacs can be produced by condensation of formaldehyde and a phenol followed by glycidation by reaction of an epihalohydrin in the presence of an alkali. The phenol can be for example, phenol, cresol, nonylphenol and t-butylphenol. Examples of the preferred epoxy novolacs include those corresponding to the formula:

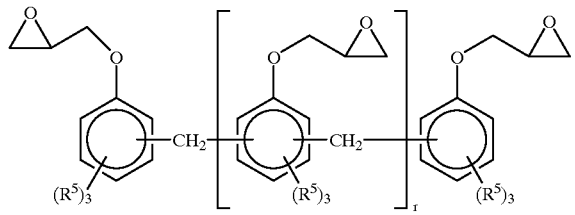

(XII)

wherein $R^5$ is independently a hydrogen or a $C_1$–$C_{10}$ alkyl group and r is a real number from 0 to 6. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with greater then one olefinic bond with peracetic acid. Examples of the preferred cycloaliphatic epoxies include those corresponding to the formula:

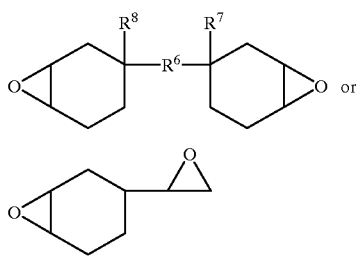

(XIII)

wherein $R^6$ is a divalent aliphatic group optionally containing ether or ester group(s) or together with $R^7$ or $R^8$ form a spiro ring optionally containing heteroatoms, and $R^9$ and $R^{10}$ are independently hydrogen or $R^7$ or $R^8$ together with $R^6$ form a spiro ring optionally containing heteroatoms such as oxygen, preferably $R^6$ contains from 1 to 20 carbon atoms. Examples of cycloaliphatic epoxies include, for example, 3,4-epoxycyclo-hexylmethyl-(3,4-epoxy)cyclohexane carboxylate, dicycloaliphatic diether diepoxy [2-(3,4-epoxy)cyclohexyl-5,5-spiro(3,4-epoxy)-cyclohexane-m-dioxane], bis(3,4-epoxy-cyclohexylmethyl)adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

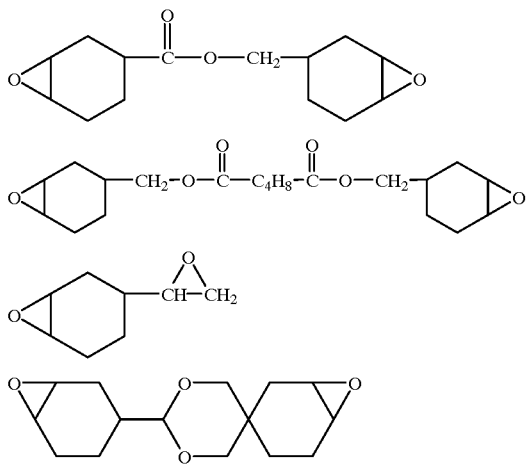

Commercial examples of preferred epoxy resins include, for example, EPON® Resins DPL-862, 828, 826, 825, 1001, 1002, EPONEX® Resin 1510, HELOXY® Modifiers 32, 62, 63, 64, 65, 67, 68, 71, 107, 116, EPON® Resin DPS155, EPON® Resin HPT 1050 and CARDURA® Resin E-10 all available from Shell Chemical Company and Union Carbide Epoxy Resins ERL-4221, -4289, -4299, -4234 and -4206.

The hydrophilic amidoamine is contacted with the hydrophobic epoxy resin under conditions effective to react the amine group and the epode group and to produce the epoxy-functional polyethers.

Epoxy Resin Component

The epoxy resin component can be any epoxy resin having a functionality of greater than 0.8 epode group per molecule, preferably at least 1.2 epode group per molecule, preferably at most to 6.5 epode group per molecule. These epoxy resins include those mentioned above for use in preparing the surfactant. Suitable epoxy resins include glycidyl ethers prepared by reacting epichlorohydrin with a compound containing, on the average, greater than one hydroxyl group carried out under alkaline reaction conditions. Examples of epoxy resins suitable for use in the invention include in addition to the epoxy resins mentioned above, polyglycidyl esters of polycarboxylic acids, and glycidylmethacrylate-containing acrylic resin. Polyglycidyl esters of polycarboxylic acids are mentioned below.

Aqueous Epoxy Resin Dispersions

In a typical aqueous dispersion of the invention useful for coating applications, the amount of the epoxy resin component (b) is from 20 to 75 percent by weight, preferably from 55 to 65 percent by weight, based on the total dispersion. Generally, a) water and b) an epoxy resin having a functionality of greater than 0.8 epode group per molecule are mixed under conditions effective to provide an oil-in-water emulsion in the presence of c) from 0.1, preferably from 0.5, more preferably from 1, to 20, most preferably to 6 weight percent, based on the epoxy resin of at least one epoxy-functional amidoamine surfactant mentioned above. One or more epoxy-functional amidoamine surfactants can be used. Optionally, a co-surfactant can be used along with the surfactant. Preferably, the dispersion also contains acetone. More preferably, the dispersion contains acetone and at least one non-volatile hydrophobic liquid resin or resin modifier. Acetone, is preferably present in an amount from 0, if present preferably from 0.5, more preferably in an amount of 1, up to preferably 5, more preferably up to 3% of the total aqueous dispersion. The non-volatile hydrophobic liquid resin or resin modifier is preferably present in an amount from 0, if present preferably in an amount from 1, to 10, preferably to 25%, based on the total amount of components b), c), and d) ii). It has been found that the invention provides a stable aqueous dispersion having an average particle size of preferably less than 2 $\mu$, more preferably less than 1 $\mu$.

The hydrophobic liquid resin or resin modifier can be any non-volatile, hydrophobic compound which is liquid, flowable at room temperature, whether neat or in a hydrophobic solution such as xylene or butanol. A substance is non-volatile when it meets the definition according to ASTM D 2369-93 or ASTM D 3960-93. For a coating composition, the hydrophobic liquid resin or resin modifier must be compatible (e.g. does not detract from corrosion resistance, or high gloss, etc.) with the curing agents in the coating composition, for example, such as amine curing agents. Preferable hydrophobic liquid resin or resin modifier include, for example, an aliphatic monoglycidylether, urea formaldehyde resin or an aliphatic monoglycidylester. Preferable hydrophobic liquid resin or resin modifier can be, for example, HELOXY® 7 Modifier (alkyl $C_8$–$C_{10}$ glycidyl ether), HELOXY® 9 Modifier ($C_{10-11}$ alkyl glycidylether) available from Shell Chemical Company and BEETLE® 216-10 Resin (alkylated urea formaldehyde high solids solution from Cytec Industries Inc).

These dispersions can be made by adding the surfactant and water to the epoxy resin to be dispersed or by producing the surfactant "in-situ" as described above. These dispersions can also be made by adding the epoxy resin to the amidoamine precursor and water. The surfactant can be produced in-situ by adding amidoamine precursor to the epoxy resin at an effective temperature to react the amidoamine and epoxy resin, or by adding the amidoamine precursor to a difunctional epoxy resin and dihydric phenol before or during the advancement reaction as described above.

The epoxy resin coating composition of the invention may include other additives, such as elastomers, stabilizers, extenders, plasticizers, pigments, pigment pastes, antioxidants, leveling or thickening agents, defoaming agents and/or cosolvents, wetting agents, cosurfactants, reactive diluents, fillers, catalysts, and the like. The aqueous dispersion can contain a monoepoxide diluent as reactive diluent.

Preferable monoepoxide diluents are those which contain a water-immiscible glycidated $C_{8-20}$ aliphatic alcohol, $C_{1-18}$ alkylphenol glycidylether, or glycidated versatic acid. The monoepoxide component can contain alicyclic and aromatic structures, as well as halogen, sulfur, phosphorus, and other such heteroatoms. Reactive diluents can be, for example, epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_{8-14}$ aliphatic alcohols.

Useful coating compositions can be obtained by mixing an amine-functional epoxy resin curing agent with the aqueous epoxy resin dispersion mentioned above.

Curing Agent

The epoxy resin curing agent can be any curing agent effective to cure (or crosslink) the epoxy resin dispersed in the aqueous solution. These curing agents are generally water compatible (i.e., dilutable and/or dispersible). Suitable curing agents for use with the dispersions include those typically employed with epoxy resins, such as aliphatic, araliphatic and aromatic amines, polyamides, amidoamines and epoxy-amine adducts. They exhibit varying levels of compatibility with water, depending upon the nature of the starting materials employed for their preparation. In many cases, partial ionization with acetic acid, propionic acid and the like is required to effect or improve water compatibility or emulsifiability.

Preferably for curing at room temperature or lower temperatures an epode equivalent to amine hydrogen equivalent ratio of from 1:0.75 to 1:1.5 are generally employed. Suitable polyalkylene amines curing agents are those which are soluble or dispersible in water and which contain more than 2 active hydrogen atoms per molecule such as diethylenetriamine, triethylenetetramine, tetraethylene-pentamine, etc. Other suitable curing agents include, for example, 2,2,4- and/or 2,4,4-trimethylhexamethylenediamine, 1,6-hexanediamine, 1-ethyl-1,3-propanediamine, 2,2(4),4-trimethyl-1,6-hexanediamine, bis(3-aminopropyl)piperazine, N-aminoethylpiperazine, N,N-bis(3-aminopropyl) ethylenediamine, 2,4(6)-toluenediamine and also cycloaliphatic amines such as 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophoronediamine, norboranediamine, 4,4'-diaminodicyclohexylmethane, 4,4'-diaminodicyclohexylmethane, 4,4'- diaminodicyclohexylpropane, 2,2-bis(4-aminocyclohexyl) propane, 3,3'-dimethyl-4,4'-diaminodicyclohexylmethane, 3-amino-1-cyclohexane-aminopropane, 1,3- and 1,4-bis (aminomethyl)cyclohexane. As araliphatic amines, in particular those amines are employed in which the amino groups are present on the aliphatic radical for example m- and p-xylylenediamine or their hydrogenation products. The amines may be used alone or as mixtures.

Suitable amine-epode adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

Polyamidoamine curing agents can be obtained, for example by reacting polyamines with polycarboxylic acids such as dimerized fatty acids. In addition to the above polyamines, the water-soluble polyoxypropylenediamines with molecular weights of 190 to 2,000 and also the readily water-dispersible curing agents, such as are described in the German Auslegeschrift 2,332,177 and the European Patent 0,000,605, for example, modified amine adducts are preferably employed. To cure the coating to completion, the coatings obtainable from these dispersions may also be heated for 30 to 120 minutes at an elevated temperature, preferably within the range of 50° C. to 120° C.

For higher temperature cure applications, aminoplast resins can be used as curing agents for epoxy resins having a high equivalent weight, e.g. greater than 700. Generally, from 5, preferably from 10, to 40, preferably to 30 weight percent of aminoplast resins, based on the combined weight of the epoxy resin and aminoplast resin, is used. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Examples of aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxy-methylol urea, butylated polymeric urea-formaldehyde resins, hexamethoxymethyl melamine, methylated polymeric melamine-formaldehyde resins and butylated polymeric melamine-formaldehyde resins.

Commercial examples of water-compatible curing agents include EPI-CURE® 8535, 8536, 8537, 8290 and 8292 Curing Agents (available from Shell Chemical Co.), ANQUAMINE 401, Casamid 360 and 362 curing agents (Air Products); EPILINK 381 and DP660 curing agents (Akzo Chemical Co.); Hardener HZ350, Hardeners 92-113 and 92-116 (Ciba Geigy); BECKOPOX EH659W, EH623W, VEH2133W curing agents (Hoechst Celanese) and EPOTUF 37-680 and 37-681 curing agents (Reichhold Chemical Co.).

The curable epoxy resin composition can be cured at a temperature within the range of from 5° C., preferably from 20° C., to 200° C., preferably to 175° C. for a time effective to cure the epoxy resin.

The aqueous dispersions of the instant invention and curing agents described above can serve as components of paints and coatings for application to substrates such as, for example, metal and cementitious structures. To prepare such paints and coatings, these resins are blended with primary, extender and anti-corrosive pigments, and optionally, additives such as surfactants, antifoam agents, rheology modifiers and mar and slip reagents. The selection and amount of these pigments and additives depends on the intended application of the paint and is generally recognized by those skilled in the art.

Examples of primary pigments include rutile titanium dioxide, such as KRONOS® 2160(Kronos, Inc.) and TI-Pure® R-960 from Du Pont, buff titanium dioxide, red iron oxide, yellow iron oxide and carbon black. Examples of extender pigments include calcium meta silicate, such as 10ES WOLLASTOKUP®(NYCO Minerals, Inc.), barium sulfate, such as SPARMITE®(Harcros Pigments, Inc.) and aluminum silicate, such as ASPO170(Englehard Corp.). Examples of anticorrosive pigments include calcium strontium phosphosilicate, such as HALOX SW111(Halox Pigments), zinc ion modified aluminum triphosphate, such as K-WHITE®084(Tayca Corp.) and basic aluminum zinc phosphate hydrate, such as HEUCOPHOS®ZPA(Heuco Tech, Ltd.).

Additional surfactants can be included in waterborne epoxy paints and coatings to improve both pigment and substrate wetting. Such surfactants are typically non-ionic, examples of which include TRITON® X-100 and TRITON X-405(Union Carbide), PLURONIC F-88 (BASF) and SURFYNOL® 104(Air Products and Chemicals).

Anti-foam agents and defoamers suppress foam generation during manufacture of the paint or coating. Useful defoamers include DREWPLUS®L-475(Drew Industrial Div.), DE FO®PF-4 Concentrate(Ultra Additives) and BYK®033 (BYK-Chemie).

Rheological additives are employed to obtain proper application properties. There are three types of additives that provide the desired thickening and shear thinning required for waterborne epoxy coatings; namely, hydroxyethylcellulose, organically modified hectorite clays and associative thickeners. NATROSOL®250 MBR and NATROSOL Plus(Aqualon) are examples of modified hydroxyethyl-cellulosics and BENTONE®LT(RHEOX, Inc.) is representative of a hectorite clay. ACRYSOL®QR-708(Rohm and Haas Co.) is an often useful associative thickener.

Mar and slip agents improve early resistance to abrasion from scrubbing or light foot traffic. Polydimethylsiloxanes and polyethylene waxes are used in this regard. An example of a commercially available wax is MICHEM LUBE®182 (MICHELMAN, INC.).

The curable paint and coating compositions can be applied to a substrate by brush, spray, or rollers.

The aqueous dispersions of the instant invention can also be used as components of adhesives and fiber sizing.

The ranges and limitations provided in the instant specification and claims are those which are believed to particularly point out and distinctly claim the present invention. It is, however, understood that other ranges and limitations which perform substantially the same function in the same or substantially the same manner to obtain the same or substantially the same result are intended to be within the scope of the instant invention as defined by the instant specification and claims.

The process of this invention will be further described by the following embodiments which are provided for illustration and are not to be construed as limiting the invention.

Illustrative Embodiment

Viscosity Viscosities were determined on the obtained emulsion or dispersion by means of a Brookfield Synchro Lectric Viscometer from Brookfield Engineering Laboratories.

Particle Size The determination of emulsion and dispersion particle sizes was accomplished with a Brookhaven Bi-DCP Particle Sizer from Brookhaven Instruments Corporation unless otherwise specified. Dn is number average particle size and Dw is mass average particle size. All particle size data is reported in microns, Percent Solids The percent solids of all products were measured by spreading a 0.5 gram sample of the product onto aluminum foil, placing the coated foil into a forced draft oven, held at 120° C., for 10 minutes, determining the residual weight of the film by ratioing the residual weight to the total weight and multiplying by 100.

Weight per Epode The weight per epode (WPE or EEW) of all products was determined by drying a weighed amount of sample by means of azeotropic distillation with methylene chloride then titrating the residue by known methods and correcting for percent solids to determine the WPE at 100% solids content.

EXAMPLE 1

Partial Conversion of a Polyoxyalkylene Polyol Composition to a Polycarboxylic Composition In the following example, the starting polyoxyalkylene polyol composition MeOPEG was a poly(ethylene glycol) methyl ether composition having a number average molecular weight of about 5,000 and an average OH functionality of about 1.1, under the name of poly(ethyleneglycol) methyl ether, commercially available from Aldrich.

200 grams of MeOPEG dissolved in 200 g of water, 0.1 grams of 4-hydroxy-2,2,6,6-tetramethyl-piperidine-1-oxyl (4-OH-TEMPO), and 10 grams of 70% percent nitric acid were charged to a 1 liter round bottom flask equipped with an overhead stir paddle, a heating mantle, a thermocouple, and a condenser hooked up to a 4° C. chill water supply. To the mixture was applied heat, stirring, and a flow of $O_2$ sparged at a rate of 35 ml/min through a pipette. Within 10 minutes, the reaction reached 50° C., at which temperature all ingredients were dissolved. The reaction temperature was held at 50° C. over an 8 hour period. An aliquot was removed, rotoevaporated at 40° C. and 30 in Hg. until a yellow solid was left. The solid was broken up into a powder, slurried in isopropyl alcohol, and filtered at room temperature. The residue was an ivory colored solid, which was easily broken up into a fine powder.

0.92 g of the powder was titrated into 1.4 ml of 0.1N NaOH to neutral. % acidity was measured to be 24.83%. Carbon-13 NMR analysis of the product measured the acid termination at 42.4, methyl ether termination at 36%, ethoxylate termination at 13.1, ester termination at 8.5%, and no aldehyde, formate or acetal termination. Accordingly, the % conversion of the MeOPEG was calculated as:

(42.4+8.5)/(42.4+8.5+13.1)=79.5%

The selectivity toward carboxyl end groups obtained was:

42.4/(42.4+8.5)=83.3%.

The results indicate that the 4-OH-TEMPO catalyst used, coupled with reacting in the presence of water, was effective to control the degree of conversion at elevated temperatures, even though the reaction was left to run for a lengthy 8 hours, without exceeding the desired degree of conversion.

EXAMPLE 2a

Partial Conversion of a Polyoxyalkylene Polyol Composition to a Polycarboxylic Composition In the following example, the starting polyoxyalkylene polyol composition PEG was a polyoxyethylene glycol composition having a number average molecular weight of about 4600 and an average OH functionality of about 2.0, obtained under the name of Carbowax 4600, commercially available from Union Carbide.

Into a 15 gallon reactor was charged 33.1 lbs of PEG 4600 under a nitrogen blanket. 3.7 lbs of deionized water was charged to the reactor and heated sufficient to dissolve the solid PEG 4600. Once in solution, the mass was cooled to 53–54° C., at which time 0.396 lbs of a 67% solution of nitric acid was charged to the autoclave, followed by charging 0.498 lbs of 4-OH-TEMPO. The reactor was deaerated three times with 20 psig oxygen gas. Oxygen was then sparged at about 900 cc/min to maintain the reactor vessel at a back-pressure of 50–55 psig throughout the reaction. Stirring was conducted at about 200 rpm.

The conversion temperature was held at about 56° C. for a period of 1 hour and 40 minutes, after which the oxygen sparge was broken and a sample was taken for analysis. For the next 35 minutes, the reaction was held at 56° C. and 20 psig oxygen backpressure while awaiting results of analysis.

The results of the analysis indicated an acid equivalent weight of 3526. Oxygen sparge was continued at 50–55 psig for another 20 minutes, after which oxygen sparge was broken and another sample was caught for analysis. During this time needed for analysis, the reaction temperature was held at 56° C. for 1 hour and 45 minutes, without any oxygen feed to the reactor. Results of analysis indicated an acid equivalent weight of 2842.

The reaction was deactivated by heating the autoclave reaction mass to a temperature of up to 96° C. over a period of about 5 hours under a vacuum ranging from 26 to 29 mmHg, while stripping out water and nitric acid. The final acid equivalent weight of the carboxylic acid composition reaction product was 2663 as measured by obtaining the acid value from an 0.1N methanolic KOH base titration. The % conversion of the polyoxyalkylene polyol composition was then calculated as 86.3%

The results indicate the successful partial conversion of the polyoxyalkylene polyol composition within a short period of time, about 2 hours. This was quickly followed with a deactivation reaction by raising the temperature to at least the deactivation temperature of the nitroxide catalyst coupled with discontinuing the oxygen sparge to keep the reaction from continuing to convert the polyoxyalkylene polyol composition beyond the desired final limit. The results indicate that a minor amount of conversion continued during the deactivation step due to the presence of nitric acid and residual oxygen remaining in the reaction mixture. However, because the nitroxide catalyst used was unstable at high temperatures, especially in the presence of water, the conversion reaction was quickly quenched within a short period of time to prevent the conversion reaction from exceeding desired limits.

EXAMPLE 2b

Manufacture of the Amidoamine

This example describes the preparation of the amidoamine surfactant compound made by reacting the carboxylic acid composition of Example 2 with a primary amine.

The contents of the carboxylic acid reaction mass in the autoclave of Example 2 were left in the autoclave, to which was charged 13.6 lbs of Dytek-A® primary amine (2-methyl-1,5-pentanediamine). The contents were allowed to react about 175° C. for about 4.25 hours, followed by removing the excess amine and water of amide condensation under a nitrogen sparge at 26–28 mmHg reduced pressure at a temperature ranging from 205 to 218° C. over a period of about 5 hours. The reaction product had an amine equivalent weight of about 2800. Subsequently, about 21 lbs of dilution water was added to the reactor and heated to produce a dispersion containing 63.4% solids. The amine equivalent weight of the solids dispersion was measured to be 3095.

EXAMPLE 2c

Partial Capping of the Amidoamine

To the reaction mass in the autoclave of Example 2b, 1.6 lbs of Cadura® E-10 epoxy (glycidated neodecanoic acid from Shell Chemical Co.) was charged and reacted with the amidoamine at about 93° C. for a period of about 1.25 hours. The final reaction product had a solids content of 64.8% and an amine equivalent weight of 3368.

EXAMPLE 2d

Manufacture of a Water Borne Epoxy Resin 690.84 grams of Epon® 828RS epoxy resin, 226.08 grams of Bisphenol A 157, and 0.486 grams of triphenylphosphine were loaded into a 2L reaction kettle equiped with a thermocouple and a short anchor. The reaction vessel temperture was set at 177° C. under 26 mmHg vacuum and a nitrogen blanket. The temperature was elevated to between 193° C. to 198° C. over a period of about 1 and ½ hours to advance the epoxy resin. When the epoxy equivalent weight reached 580, the heat was lowered to about 98° C., after which 27.72 grams of Arcosolv PM was added. Vacuum and the flow of nitrogen were discontinued for the next ½ hours while the reaction mass temperature dropped to 110° C., after which 76.37 grams of the partially capped amidoamine prepared in example 2c above was added to the kettle. The reaction was allowed to proceed for about 2 hours, during which time the reaction mass temperature cooled to 98° C.

Subsequently, 157.8 g of inversion water was added after which 18.54 grams of Heloxy® 9 epoxy resin, a monoepoxide of a C12–C13 alcohol, available from Shell Chemical Company, and 31.5 grams of acetone were added. The reaction mass cooled further to about 62° C. The reaction was allowed to proceed for about another 2 hours, after which 250 g of dilution water was added. The following day, the next batch of 150 g of dilution water was added. The final dispersion was milky white, with a % N.V. (solids) of 56.23, and a mean surface area of about 0.9 microns.

The stability of the dispersion was measured by placing the dispersion in an oven at about 49° C. for a period of 2 weeks. The initial viscosity was measured at 10,160 cps. After 2 weeks, the viscosity changed to only 12,360 cps.

EXAMPLE 3

Partial Conversion of a Polyoxyalkylene Polyol Composition to a Polycarboxylic Composition The procedure of Example 2a was repeated with the same equipment. Oxygen was sparged in at a rate of 760 cc/min, and the conversion temperature was held at about 56° C. for a period of 3 hours and 20 minutes. Deactivation of the nitroxide catalyst and stripping of the nitric acid and water were conducted in the same manner as in Example 2a. The acid equivalent weight after completion of the reaction was about 2623. The % conversion of the polyoxyalkylene polyol composition was calculated as 87.6%.

EXAMPLE 3b

Manufacture of the Amidoamine

The procedure and ingredients of Example 2b were used to make the amidoamine by reacting 13.6 lbs of the Dyatek-A® amine with the polycarboxylic acid composition make in Example 3a. The amine equivalent weight of the amidoamine was measured at 2483. Upon diluting with water, the solids % was measured at 63%, and the amine equivalent weight was measured at 2507 after heating the amidoamine in the dilution water.

EXAMPLE 3c

Partial Capping of the Amidoamine

The procedure of Example 2c was followed, except that 1.81 lbs of the Cardura® E-10 monoepoxide was charged to the autoclave reaction mass of Example 3b. The final properties were measured as 63.2% solids and an amine equivalent weight of 2797.

EXAMPLE 4d

Manufacture of the Water Borne Epoxy Resin

The same procedure and ingredients used in Example 2d were employed in amounts of 711.43 g of the Epon® resin 828RS, 225.62 g of BPA 157, 0.31 g of TPP, 28.48 g of Arcosolv PM, 78.97 g of the partially capped amidoamine made in Example 3c, 127.25 g of inversion water, 18.97 g of the Heloxy® 9 resin, 32.2 g of acetone, and 570.6 g of dilution water. The fusion reaction was advanced until the epoxy equivalent weight reached 532, after which the Arcosolv and surfactant of Example 3c were added.

The final properties of the dispersion were 56.01% NV (solids), 504.86 wpe, 5500 cps, and mean surface area of 0.596 microns. Stability test in the oven showed an increase from 5500 cps to 9660 cps after one week, and athereafter to 10600 at 3 weeks.

We claim:

1. A process for preparing a polycarboxylic acid composition comprising reacting a polyoxyalkylene polyol composition with a stable free radical nitroxide in the presence of an $NO_x$ generating compound under conditions sufficient to convert from 60% to no more than 95% of the polyoxyalkylene polyol composition.

2. The process of claim 1, wherein said process converts from 75% to no more than 90% of the polyoxyalklyene polyol composition.

3. The process of claim 2, wherein said process converts from 80% to 88% of the polyoxyalkylene polyol composition.

4. The process of claim 1, wherein said free radical nitroxide has the formula:

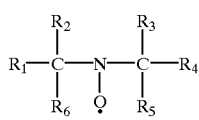

wherein
(1) each of R1, R2, R3 and R4 is an alkyl, aryl or heteroatom substituted alkyl group having 1 to about 15 carbon atoms, and R5 and R6
    (i) each is an alkyl group having 1 to about 15 carbon atoms provided that R1–R6, are not all alkyl groups, or a substituted alkyl group having 1 to about 15 carbon atoms wherein the substituent is hydrogen, cyano, —CONH2, —OCOCH, OCOC2H5, carbonyl, alkenyl wherein the double bond is not conjugated with the nitroxide moiety, or —COOR wherein R of the —COOR group is alkyl or aryl, or (ii) together form part of a ring that contains 5 carbon atoms and up to two heteroatoms of O or N, or (2) the

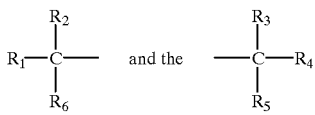

moieties individually are aryl.

5. The process of claim 4, wherein the free radical nitroxide is represented by the formula:

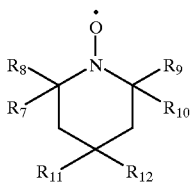

wherein $R_7$, $R_8$, $R_9$, $R_{10}$ are each independently hydrogen or an alkyl, aryl, or aralkly group having from 1 to 15 carbon atoms, $R^{11}$ or $R^{12}$ is —OH, OR', —OCOR', —NHR', ONHR', or —NHCOR', and R' is an alkyl, aryl, alkaryl, or alicyclic group.

6. The process of claim 5, wherein $R^{11}$ or $R^{12}$ is —OH.

7. The process of claim 1, wherein the free radical nitroxide is represented by the formula:

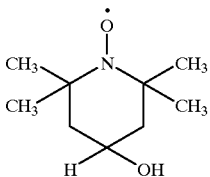

and the process converts from 80% to no more than 90% of the polyoxyalkylene polyol.

8. The process of claim 1, wherein the polyoxyalkylene polyol composition has an average OH functionality ranging from 1.05 to 2.2.

9. The process of claim 8, wherein the polyoxyalkylene polyol composition has an average OH functionality ranging from 1.1 to 2.

10. The process of claim 9, wherein the polyoxyalkylene polyol composition has an average OH functionality ranging from 1.5 to 2.0.

11. The process of claim 10, wherein polyoxyalkylene polyol composition comprises one or more of compounds represented by the following formulas:

(E)

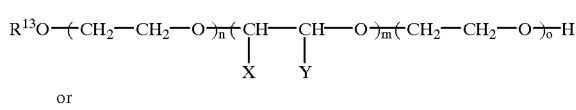

or (F)

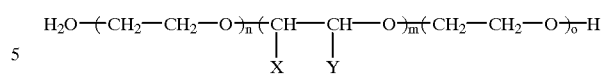

wherein $R^{13}$ is an alkyl, aryl, aryalkyl, or cycloaliphatic group or mixtures thereof having 1 to 15 carbon atoms, optionally containing non-reactive oxygen, X and Y are independently a hydrogen, methyl or ethyl group with the provision that if X is methyl or ethyl, Y is hydrogen or if Y is methyl or ethyl, X is hydrogen, and n+m+o is a real number from 40 to 400, and n+o is a real number from 40 to 400.

12. The process of claim 11, wherein the polyoxyalkylene polyol composition has an average OH functionality ranging from 1.05 to 2.2.

13. The process of claim 8, wherein m=0, and the polyoxyalkylene polyol composition has an average OH functionality ranging from 1.5 to 2.

14. The process of claim 11, wherein the polyoxyalkylene polyol composition has an number average molecular weight ranging from 2000 to 7000.

15. The process of claim 1, wherein the reaction between the polyoxyalkylene polyol composition and the free radical nitroxide is conducted in the presence of an additional oxidant.

16. The process of claim 15, wherein the additional oxidant comprises oxygen.

17. The process of claim 16, wherein sufficient oxygen is added to create a back pressure in ranging from 50 to 57 psig.

18. The process of claim 1, wherein the free radical nitroxide comprises a nitroxide of the formula:

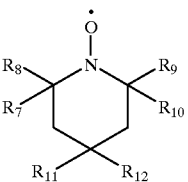

wherein the $R_7$, $R_8$, $R_9$, $R_{10}$ are each independently hydrogen or an alkyl, aryl, or aralkly group having from 1 to 15 carbon atoms, $R^{11}$ or $R^{12}$ is —OH, —OR', —OCOR', —NHR', —ONHR', or —NHCOR', and R' is an alkyl, aryl, alkaryl, or alicyclic group; and the reaction between said nitroxide and the polyoxyalkylene polyol composition is conducted in the presence of water and oxygen.

19. The process of claim 1, wherein from 70% to no more than 90% of the polyoxyalkylene polyol composition is converted to carboxyl end groups.

20. A process for preparing a polycarboxylic acid composition comprising:

a) contacting a polyoxyalkylene polyol composition with a stable free radical nitroxide comprising a nitroxide having the formula:

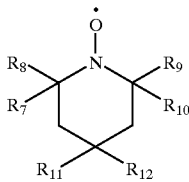

wherein the $R_7$, $R_8$, $R_9$, $R_{10}$ are each independently hydrogen or an alkyl, aryl, or aralkly group having from 1 to 15 carbon atoms, $R^{11}$ or $R^{12}$ is —OH, —OR', —OCOR', —NHR', —ONHR', or —NHCOR', and R' is an alkyl, aryl, alkaryl, or alicyclic group; and an $NO_x$ generating source; and optionally water;

b) converting the polyoxyalkylene polyol composition at a temperature of less than the deactivation temperature of the free radical nitroxide, in the presence of a flow of air or oxygen; and c) completing the conversion by discontinuing the flow of air or oxygen, and raising the temperature to at least the deactivation temperature of the free radical nitroxide; whereby 60% to no more than 95% of the polyoxyalkylene polyol composition is converted.

21. The process of claim 20, wherein step b is conducted at any temperature ranging from 45° C. to 60° C. or less, and step c is conducted at greater than 60° C.

22. The process of claim 21, wherein the conversion is conducted in the presence of water and at a pressure in the range of 50–57 psig.

23. The process of claim 20, wherein the free radical nitroxide comprises a nitroxide represented by the following formula:

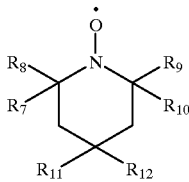

wherein $R_7$, $R_8$, $R_9$, $R_{10}$ are each independently hydrogen or an alkyl, aryl, or aralkly group having from 1 to 15 carbon atoms, and $R^{11}$ is hydrogen, and $R^{12}$ is —OH.

24. The process of claim 23, wherein the conversion is conducted in the presence of water.

25. The process of claim 24, wherein amount of water is in the range of 2 wt. % to 20 wt. %, based on the weight of all ingredients.

26. The process of claim 25, wherein the amount of water is in the range of 5 wt. % to 15 wt. %, based on the weight of all ingredients.

27. The process of claim 24, wherein the conversion is conducted in the presence of a flow of oxygen.

28. The process of claim 27, wherein 80% to no more than 90% of the polyoxyalkylene polyol composition is converted within a period of 3 hours or less.

29. The process of claim 28, wherein the polyoxyalkylene polyol composition is converted in a period of 1 to 2 hours.

30. The process of claim 24, wherein the conversion is conducted at any temperature ranging from 50° C. to 58° C.

31. The process of claim 20, wherein the conversion is conducted in the presence of water, and water and the $NO_x$ generating source are removed in step c by distillation.

32. The process of claim 20, wherein in step c the temperature is raised and maintained within a range of 70° C. to 110° C. for a period of 15 minutes to 2 hours.

33. The process of claim 32, wherein the temperature is raised and maintained within a range of 80° C. to 100° C. for a period of 0.5 hours to 1.5 hours under a pressure less than the conversion pressures.

34. The process of claim 20, wherein polyoxyalkylene polyol composition comprises one or more of compounds represented by the following formulas:

(E)

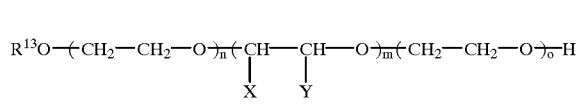

or (F)

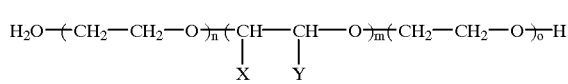

wherein $R^{13}$ is an alkyl, aryl, aryalkyl, or cycloaliphatic group or mixtures thereof having 1 to 15 carbon atoms, optionally containing non-reactive oxygen, X and Y are independently a hydrogen, methyl or ethyl group with the provision that if X is methyl or ethyl, Y is hydrogen or if Y is methyl or ethyl, X is hydrogen, and n+m+o is a real number from 40 to 400, and n+o is a real number from 40 to 400.

35. The process of claim 34, wherein the polyoxyalkylene polyol composition has an average OH functionality ranging from 1.05 to 2.2.

36. The process of claim 35, wherein m=0, and the polyoxyalkylene polyol composition has an average OH functionality ranging from 1.5 to 2.

37. The process of claim 36, wherein the polyoxyalkylene polyol composition has an number average molecular weight ranging from 2000 to 6000.

38. The process of claim 20, wherein from 70% to no more than 90% of the polyoxyalkylene polyol composition is converted to carboxyl end groups.

39. The process of claim 38, wherein from 80% to no more than 90% of the polyoxyalkylene polyol composition is converted to carboxyl end groups.

40. A process for preparing a polycarboxylic acid composition comprising reacting a polyoxyalkylene polyol composition with a stable free radical nitroxide in the presence of water, an $NO_x$ generating compound, and a flow of air or oxygen, to convert from 60% to no more than 95% of the polyoxyalkylene polyol composition to carboxyl end groups.

41. A process for preparing a polycarboxylic acid composition comprising reacting a polyoxyalkylene polyol composition with a stable free radical nitroxide comprising:

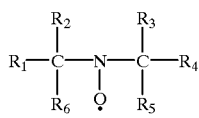

wherein:
(1) each of R1, R2, R3 and R4 is an alkyl, aryl or heteroatom substituted alkyl group having 1 to about 15 carbon atoms, and R5 and R6:
(i) each is an alkyl group having 1 to about 15 carbon atoms provided that R1–R6, are not all alkyl groups, or a substituted alkyl group having 1 to about 15 carbon atoms wherein the substituent is hydrogen, cyano, —CONH2, —OCOCH, OCOC2H5, carbonyl, alkenyl wherein the double bond is not conjugated with the nitroxide moiety, or —COOR wherein R of the —COOR group is alkyl or aryl, or
(ii) together form part of a ring that contains 5 carbon atoms and up to two heteroatoms of O or N, or
(2) the

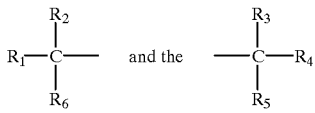

moieties individually are aryl; in the presence of an $NO_x$ generating compound under conditions sufficient to convert from 60% to no more than 95% of the polyoxyalkylene polyol composition.

42. The process of claim 41, wherein the free radical nitroxide is represented by the formula:

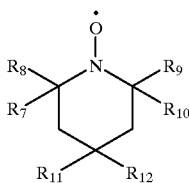

wherein $R_7$, $R_8$, $R_9$, $R_{10}$ are each independently hydrogen or an alkyl, aryl, or aralkly group having from 1 to 15 carbon atoms, $R^{11}$ or $R^{12}$ is —OH, OR', —OCOR', —NHR', ONHR', or —NHCOR', and R' is an alkyl, aryl, alkaryl, or alicyclic group.

43. The process of claim 41, wherein R' is —OH.
44. The process of claim 43, wherein the reaction is conducted in the presence of a flow of oxygen.
45. The process of claim 44, wherein the reaction is conducted in the presence of water.
46. The process of claim 45, wherein the conversion is completed at or before 3 hours.
47. The process of claim 41, wherein from 70% to no more than 90% of the polyoxyalkylene polyol composition is converted to carboxyl end groups.
48. A process for the partial oxidation of a polyoxyalkylene polyol composition comprising:
   a) contacting a polyoxyalkylene polyol composition with at least a stable free radical nitroxide comprising a nitroxide having the formula:

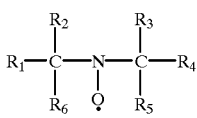

wherein (1) each of R1, R2, R3 and R4 is an alkyl, aryl or heteroatom substituted alkyl group having 1 to about 15 carbon atoms, and R5 and R6:
   (i) each is an alkyl group having 1 to about 15 carbon atoms provided that R1–R6, are not all alkyl groups, or a substituted alkyl group having 1 to about 15 carbon atoms wherein the substituent is hydrogen, cyano, —CONH2, —OCOCH, OCOC2H5, carbonyl, alkenyl wherein the double bond is not conjugated with the nitroxide moiety, or —COOR wherein R of the —COOR group is alkyl or aryl, or (ii) together form part of a ring that contains 5 carbon atoms and up to two heteroatoms of O or N, or
(2) the

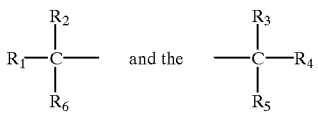

moieties individually are aryl; an $NO_x$ generating source; and water;
   b) converting the polyoxyalkylene polyol composition at a temperature of 60° C. or less in the presence of a flow of air or oxygen and water; and subsequently
   c) discontinuing the flow of air or oxygen, and removing the $NO_x$ generating source and the water at a temperature of greater than 60° C.

49. The process of claim 48, wherein step b is conducted at any temperature ranging from 45° C. to 60° C. or less, and the temperature of step c) is greater than 80° C.
50. The process of claim 49, wherein the conversion is conducted at a pressure in the range of 50–57 psig.
51. The process of claim 48, wherein the free radical nitroxide comprises a nitroxide represented by the following formula:

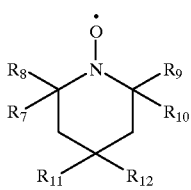

wherein $R_7$, $R_8$, $R_9$, $R_{10}$ are each independently hydrogen or an alkyl, aryl, or aralkly group having from 1 to 15 carbon atoms, $R^{11}$ or $R^{12}$ is hydrogen or —OH, provided that at least one is —OH.

52. The process of claim 48, wherein amount of water is in the range of 2 wt. % to 20 wt. % based on the weight of all ingredients.
53. The process of claim 52, wherein the amount of water is in the range of 5 wt. % to 15 wt. %, based on the weight of all ingredients.
54. The process of claim 52, wherein the conversion is conducted in the presence of a flow of oxygen.
55. The process of claim 48, wherein the conversion reaction is conducted within a period of 3 hours or less.
56. The process of claim 48, wherein the conversion is conducted at any temperature ranging from 50° C. to 58° C.
57. The process of claim 48, wherein water and the $NO_x$ generating source are removed in step c by distillation.
58. The process of claim 48, wherein in step c the temperature is raised and maintained within a range of 70° C. to 110° C. for a period of 15 minutes to 2 hours, optionally under reduced pressure.
59. The process of claim 48, wherein polyoxyalkylene polyol composition comprises one or more of compounds represented by the following formulas:

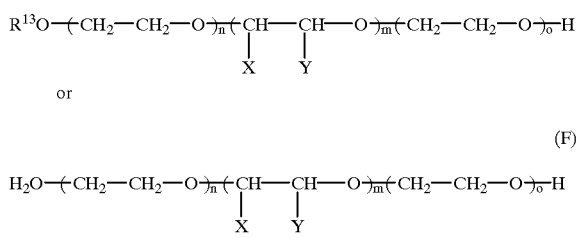

wherein $R^{13}$ is an alkyl, aryl, aryalkyl, or cycloaliphatic group or mixtures thereof having 1 to 15 carbon atoms, optionally containing non-reactive oxygen, X and Y are independently a hydrogen, methyl or ethyl group with the provision that if X is methyl or ethyl, Y is hydrogen or if Y is methyl or ethyl, X is hydrogen, and n+m+o is a real number from 40 to 400, and n+o is a real number from 40 to 400.

60. The process of claim 59, wherein the polyoxyalkylene polyol composition has an average OH functionality ranging from 1.5 to 2, and m=0.

61. The process of claim 59, wherein the polyoxyalkylene polyol composition has an number average molecular weight ranging from 2000 to 6000.

* * * * *